(12) United States Patent
Huang et al.

(10) Patent No.: US 8,719,596 B2
(45) Date of Patent: May 6, 2014

(54) CONTROL, DETECTION APPARATUS OF POWER OF NETWORK AND DETECTION METHOD

(75) Inventors: Chin-Wei Huang, Hsinchu (TW); Shan-Chih Tsou, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1386 days.

(21) Appl. No.: 11/682,520

(22) Filed: Mar. 6, 2007

(65) Prior Publication Data

US 2007/0210762 A1    Sep. 13, 2007

(30) Foreign Application Priority Data

Mar. 6, 2006 (TW) .............................. 95107477 A

(51) Int. Cl.
*G06F 1/28* (2006.01)
(52) U.S. Cl.
USPC ............................................................ 713/300
(58) Field of Classification Search
USPC ............................................................ 713/300
See application file for complete search history.

(56) References Cited

U.S. PATENT DOCUMENTS

| | | | |
|---|---|---|---|
| 5,329,239 A * | 7/1994 | Kindermann et al. | ........ 324/678 |
| 5,949,259 A | 9/1999 | Garcia | |
| 5,990,663 A * | 11/1999 | Mukainakano | ............... 320/134 |
| 6,353,337 B2 * | 3/2002 | Nasu et al. | ...................... 326/83 |
| 6,429,709 B1 | 8/2002 | Hall et al. | |
| 6,587,001 B1 | 7/2003 | Wyles et al. | |
| 6,597,183 B1 * | 7/2003 | Male | ............................. 324/607 |
| 6,717,369 B2 | 4/2004 | Verhoeven et al. | |
| 7,248,097 B2 * | 7/2007 | Montgomery | ................ 327/538 |
| 7,449,796 B2 * | 11/2008 | Elkayam et al. | ................... 307/1 |
| 7,548,799 B2 * | 6/2009 | Landry et al. | ................. 700/297 |
| 7,856,561 B2 * | 12/2010 | Stineman et al. | ............. 713/300 |

FOREIGN PATENT DOCUMENTS

| | | |
|---|---|---|
| TW | 427066 | 3/2001 |
| TW | 541780 | 7/2003 |
| TW | 200405240 | 4/2004 |
| TW | 255606 | 5/2006 |

* cited by examiner

*Primary Examiner* — Kim Huynh
*Assistant Examiner* — Eric Chang
(74) *Attorney, Agent, or Firm* — McClure, Qualey & Rodack, LLP

(57) ABSTRACT

A method for detecting a capacitive load circuit of a remote powered device in a communication system is disclosed. The communication system includes the power source device being coupled to the remote powered device by a cable. the method comprises: providing a first current to the capacitive load circuit of the remote powered device; charging or discharged the capacitive load circuit of the remote powered device according to the first current; and detecting a voltage value or a slope of a first voltage of the capacitive load circuit to generate a detection result. The method further comprises: providing an operation voltage to the remote powered device.

21 Claims, 3 Drawing Sheets

CONTROL, DETECTION APPARATUS OF POWER OF NETWORK AND DETECTION METHOD

FIELD OF THE INVENTION

The present invention relates to a communication system, and more particularly to an Ethernet network system.

BACKGROUND OF THE INVENTION

Power over Ethernet (PoE) technology generally allows existing cables to transmit data as well as electric power without changing the existing Ethernet architecture. At present, the PoE technology has been approved by the Institute of Electrical and Electronics Engineers (IEEE), and the IEEE 802.3af standard is established for specifying the items related to power detection and control of a network power supply system.

In the IEEE 802.3af standard, a power source device of a network power supply system must detect whether or not the equivalent resistance and the equivalent capacitance of a powered device (which is referred to as a capacitive load circuit) meet the specifications of the IEEE 802.3af standard and output the power to the powered device when the powered device is in compliance with the PoE standard. However, it is difficult to accurately measure the value of the equivalent capacitance of the powered device, so the conventional method only measures the equivalent resistance of the powered device. Therefore, the performance of the conventional method is not perfect.

SUMMARY OF THE INVENTION

One of objectives of the present invention is to provide a PoE detection apparatus of a network power supply device which is used for determining whether a capacitive load circuit of a powered device meet the specification of the IEEE 802.3af standard.

One of objectives of the present invention is to provide a PoE detection apparatus of a network power supply device. The PoE detection apparatus determines whether a capacitive load circuit of a powered device and obtains an accurate capacitance value of the capacitive load circuit of the powered device.

Another objective of the present invention is to use detecting at least one of charging and discharging characteristic of the capacitive load circuit in the remote powered device to determine the status of the capacitive load circuit of a remote powered device.

BRIEF DESCRIPTION OF THE DRAWINGS

The subject matter regarded as the invention is particularly pointed out and distinctly claimed in the concluding portion of the specification. The invention, both as to device and method of operation, together with features and advantages thereof may best be understood by reference to the following detailed description with the accompanying drawings in which:

DETAILED DESCRIPTION OF THE PREFERRED EMBODIMENTS

While the specifications describe at least one embodiment of the invention considered best modes of practicing the invention, it should be understood that the invention can be implemented in many ways and is not limited to the particular examples described below or to the particular manner in which any features of such examples are implemented.

Figure 1:
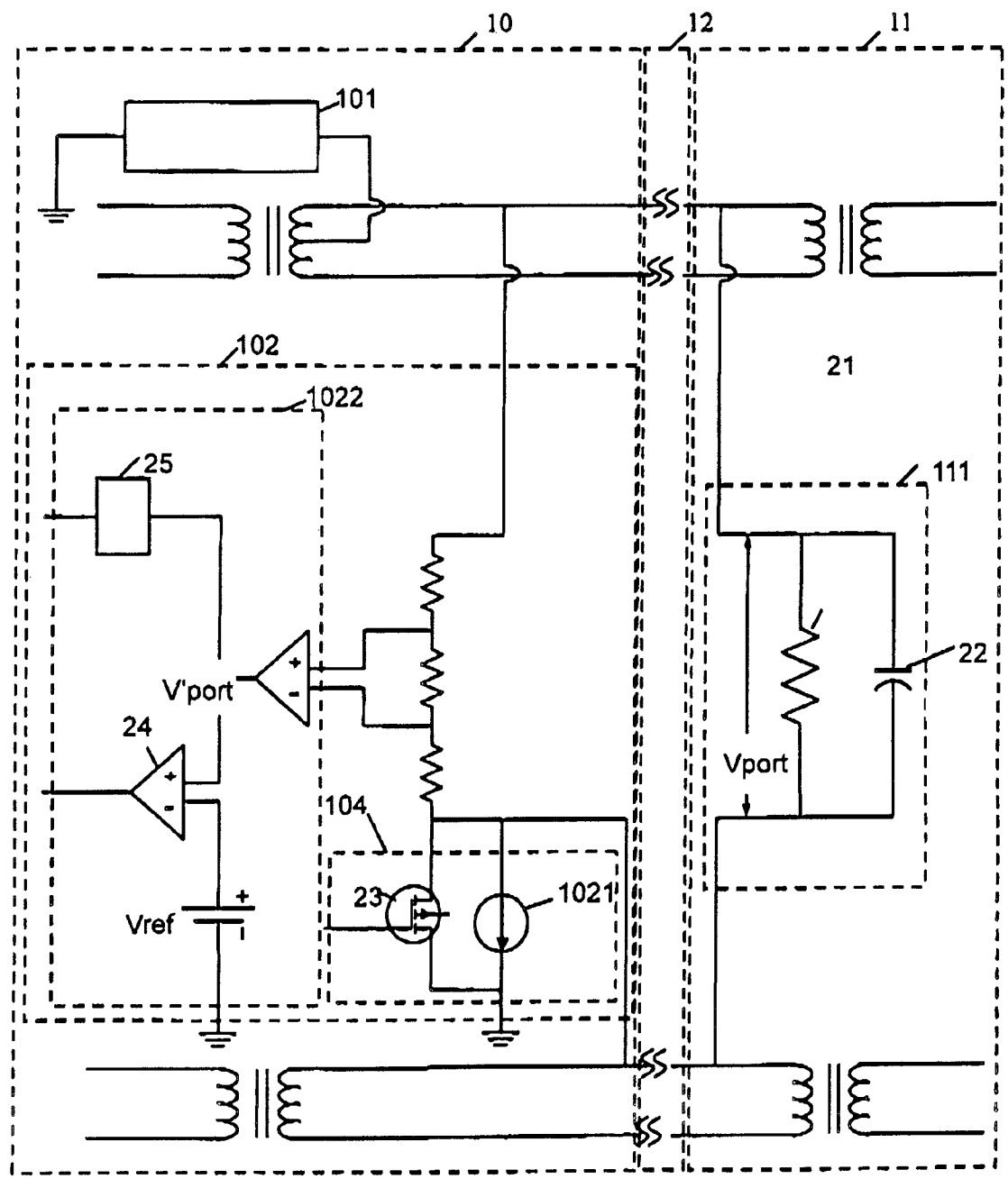
FIG. 1 is a block diagram of an embodiment of a PoE detection apparatus of network power supply system of the present invention.

Referring to FIG. 1 for a block diagram of PoE detection apparatus of a network power supply system of the present invention. In FIG. 1, a power source device 10 is connected to a remote powered device 11 by a cable 12 such as an Ethernet cable. The power source device 10 comprises a power supply circuit 101, a PoE detection circuit 102 which includes a detector 1022 and a control circuit 104. The remote powered device 11 includes a capacitive load circuit 111 which comprises internal corresponding equivalent resistance 21 and capacitance 22 connected in parallel. Furthermore, both of the power supply device 11 and the remote powered device 12 include a plurality of transformers. In an Ethernet system, the cable 12 is an Ethernet cable which includes 4 pair of Unshielded Twisted Pair (UTP) lines. In this example, the power supply device 11 includes 4 transformers. When the power supply device is coupled to the remote powered device over the cable 12, the power supply circuit 101 to provide a power supply to charge the capacitive load circuit 111. Finally, the charge of the capacitive load circuit 111 is completed, and the first voltage of the capacitive load circuit 111 rises to a predetermined value. The PoE detection circuit 102 can use a current source 1021 of the control circuit 104 to supply a steady first current for discharging the capacitive load circuit 111, so that the first voltage of the capacitive load circuit 111 is decreased slowly. After a specific time interval, the PoE detection circuit 102 can use the detector 1022 to measure the first voltage of the capacitive load circuit 111 of the remote powered device and determine whether or not the remote powered device 11 is in compliance with the Ethernet over Power (PoE) standard. The power supply circuit 101 will provide an operation voltage to the powered device 11 through a powering path (cable 12). Of course, the PoE detection circuit 102 also can detect the charging characteristic of the capacitive load circuit 111 to control the power supply circuit 101. Please refer to FIG. 1, the detection circuit 102 is coupled between the at least two pair lines of the cable 12.

In a preferred embodiment, the detector 102 generates a comparison result by comparing the first voltage of the capacitive load circuit 111 with a predetermined threshold or comparing a slope of the first voltage of the capacitive load circuit 111 with a predetermined slope threshold. In an embodiment, the control circuit 104 includes a switch 23 and a current source 1021. The switch 23 controls the charge and discharge of the equivalent capacitor 22 of the capacitive load circuit 111. In an embodiment, when the switch element 23 is switched ON, the current source 1021 connected in parallel with the switch element 23 can be viewed as an open circuit, then the power supply circuit 101 will be able to provide a power to charge the equivalent capacitor 22. If the voltage of the equivalent capacitor 22 has reached a predetermined voltage such as 8.8 volt, the switch element 23 will be switched OFF, and such arrangement will discharge the equivalent capacitor 22. For constant discharge of the equivalent capacitor 22, the current source 1021 is connected in series with the capacitive load circuit 111 and provides a constant current to the capacitive load circuit 111 to assure the output of a first voltage Vport of the capacitive load circuit 111 by the constant discharge current, and the principle of charging/discharging operation can be understood from the basic discharge equation of a capacitor, and thus will not be described in details here. When the first voltage Vport can be measured easily, and the first current of the invention is a constant current. Because the equivalent resistance 21 need to be set to constant or a constant range to comply with PoE standard, the equivalent capacitance 22 of the invention will be able to easily compute the capacitance value or its range.

In a preferred embodiment, the detection circuit 1022 includes a comparator 24 for comparing one of the amplified voltage differences V'port corresponding to the first voltage Vport with a predetermined voltage threshold Vref, or comparing the first voltage Vport from the capacitive load circuit 111 with a predetermined voltage threshold Vref, and the output signal of the comparator 24 indicates whether or not the power source device 10 needs to provide an operation voltage to the powered device 11. If said comparison voltages reach these thresholds, the power supply device 10 will drive the power supply circuit 101 to provide an operation voltage to the powered device 11 and the powered device 11 will be normal operation. In a preferred embodiment as shown in FIG. 1, the amplified voltage difference V'port is produced by the resistive voltage division of the first voltage Vport. Although the resistive voltage division as shown in FIG. 1 is comprised of three resistors, two resistors also can be used for the resistive voltage division instead.

In another preferred embodiment, the detector 1022 includes an analog-to-digital converter 25 for converting the first voltage Vport or the amplified voltage difference V'port into a digital signal and determines whether or not to provide a power supply to the powered device 11 according to the digital signal. In another preferred embodiment, the PoE detection circuit 102 further includes a calculating unit (not shown in FIG. 1) for calculating a slope of the first voltage Vport from the capacitance of the capacitive load circuit 111.

Figure 2:
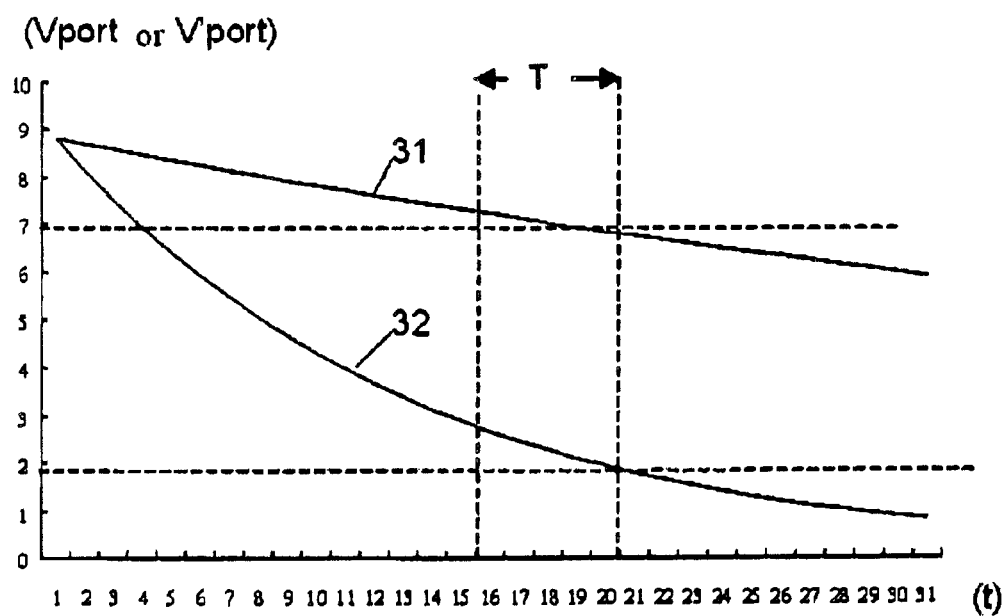
FIG. 2 is a graph of a discharging characteristic of capacitive load circuit versus time in accordance with the present invention.

Referring to FIG. 2 for a graph of the discharge characteristic versus time in accordance with the present invention, curves 31, 32 represent the change of the first voltage with respect to time for the capacitance 3 μF or 0.5 μF of two different examples respectively. After the capacitor of any one of the examples is discharged for a period of time T such as 20 seconds, the first voltage Vport or amplified voltage difference V'port of the corresponding discharge is 7 volt or 2 volt. In an embodiment, when Vport or V'port is similar to the predetermined voltage threshold Vref, the detector 1022 drives the power supply circuit 101 to provide a power supply to the powered device 11. In another embodiment, when the slope of Curve 31 or Curve 32 at the corresponding time period T equal to 15~20 seconds is between a predetermined slope threshold range, the power supply circuit 101 will provide a power supply to the powered device 11.

Figure 3:
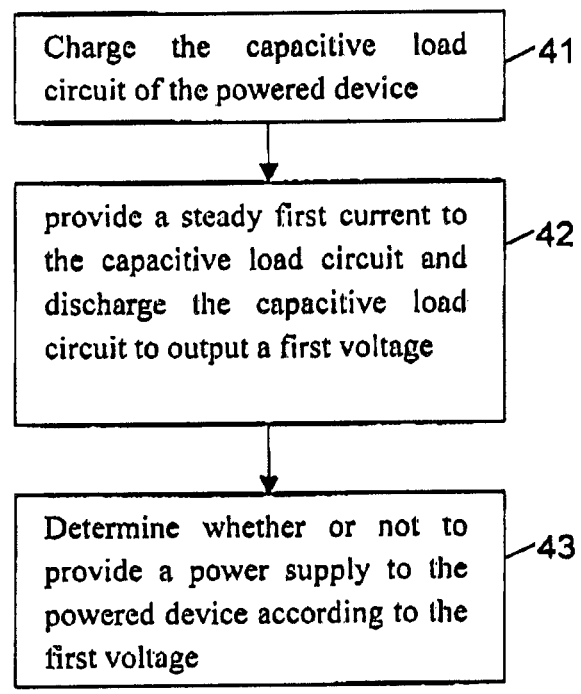
FIG. 3 is a flow chart of an embodiment of a PoE detection method of the present invention.

Referring to FIG. 3 for a flow chart of a detection method of this invention, the detection method comprises the steps of:

Step 41: charging a capacitive load circuit 111;

Step 42: using a current source 1021 to provide a steady first current to discharge the capacitive load circuit 111, and outputting a first voltage Vport; and Step 43: determining whether or not to provide an operation voltage to the powered device 11 according to the discharging characteristic of the first voltage Vport.

Of course, the above-mentioned method is only an illustration, and is not a limitation of the present invention. For example, the method can monitor the charging characteristic of the capacitive load circuit to determine whether or not to provide an operation voltage to the powered device 11.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus, which is located at a power supply device, for detecting a remote powered device, the power supply device being coupled to the remote powered device by a cable, the apparatus comprising:
   a power supply circuit, for providing a power supply to the remote powered device according to a detection result based on a discharging characteristic of a capacitive load circuit of the remote powered device;
   a control circuit comprising a switch coupled in parallel with a current source, the current source providing a constant first current for charging or discharging the capacitive load circuit of the remote powered device, wherein the capacitive load circuit of the remote powered device provides a first voltage, wherein when the switch is turned on, the switch connected in parallel with the current source is approximately an open circuit; and
   a detection circuit, for detecting the first voltage of the capacitive load circuit of the remote powered device and thereby outputting the detection result, wherein the detection result indicates whether a capacitance value of the capacitive load circuit meets a designated capacitance standard for the capacitive load circuit.

2. The apparatus of claim 1, wherein said switch controls the charge and discharge of said capacitive load circuit.

3. The apparatus of claim 1, wherein said capacitive load circuit and said current source are coupled in series.

4. The apparatus of claim 1, wherein said capacitive load circuit includes a parallel circuit of a resistor and a capacitor.

5. The apparatus of claim 1, wherein said detection circuit includes a comparator for comparing the first voltage and a predetermined threshold to output the detection result.

6. The apparatus of claim 1, wherein said detection circuit includes an analog-to-digital converter for converting the first voltage into a digital value, the detection circuit outputs the detection result according to the digital value.

7. The apparatus of claim 1, wherein said cable is an Unshielded Twisted Pair (UTP) cable.

8. The apparatus of claim 1, wherein the power supply device comprises four transformers for coupling to the cable.

9. The apparatus of claim 1 being in compliance with the IEEE 802.3af standard.

10. The apparatus of claim 1, wherein the detection circuit calculates a slope of the first voltage to generate a slope result, and outputs the detection result according to the slope result.

11. The apparatus of claim 1, wherein the cable comprises at least two pair lines and the apparatus is coupled between the at least two pair lines.

12. A method for detecting a capacitive load circuit of a remote powered device in a communication system which includes a power source device being coupled to the remote powered device by a cable, the method comprising:
   providing a constant first current via a switch coupled in parallel with a current source to the capacitive load circuit of the remote powered device;

charging or discharging the capacitive load circuit of the remote powered device according to the first current; and detecting a first voltage of the capacitive load circuit to generate a detection result based on a discharging characteristic of the capacitive load circuit of the remote powered device, wherein the detection result indicates whether a capacitance value of the capacitive load circuit meets a designated capacitance standard for the capacitive load circuit.

13. The method of claim 12, wherein the capacitive load circuit includes a parallel circuit of a resistor and a capacitor.

14. The method of claim 12, wherein the cable is an Ethernet cable.

15. The method of claim 12, wherein said capacitive load circuit and said current source are coupled in series.

16. The method of claim 12, the step of detecting comprising:

comparing the first voltage and a predetermined threshold to generating a comparison result; and generating the detection result according to the comparison result.

17. The method of claim 12, the step of detecting comprising:

converting the first voltage into a digital value; and generating the detection result according to the comparison result.

18. The method of claim 17, the step of detecting comprising:

calculating a slope of the first voltage to a calculated signal; and generating the detection result according to the calculated signal.

19. The method of claim 12, further comprising:

providing an operation voltage to the remote powered device according to the detection result.

20. An apparatus implemented in a power supply device configured to detect a remote powered device, the power supply device being coupled to the remote powered device, the apparatus comprising:

a power supply circuit configured to provide a power supply to the remote powered device according to a detection result based on a discharging characteristic of a capacitive load circuit of the remote powered device;

a control circuit comprising a switch coupled in parallel with a current source, the current source being configured to provide a constant current to the capacitive load circuit of the remote powered device, wherein the capacitive load circuit of the remote powered device provides a voltage, wherein the power supply circuit provides the power supply to the remote powered device when the switch coupled with the current source is configured as approximately an open circuit; and a detection circuit configured to compare an attribute of the voltage across the capacitive load circuit of the remote powered device to a threshold value, the detection circuit further configured to output a detection result based on the comparison, wherein the threshold value comprises one of a threshold voltage value and a threshold slope value.

21. The apparatus of claim 20, wherein the current source provides the constant current to discharge the capacitive load circuit.

* * * * *